United States Patent
Ronayne et al.

[15] 3,669,229
[45] June 13, 1972

[54] POWER TAKE-OFF CONTROL VALVE

[72] Inventors: Ronald J. Ronayne; Edwin Ketterling, both of Charles City, Iowa

[73] Assignee: White Farm Equipment Company, Cleveland, Ohio

[22] Filed: Feb. 9, 1970

[21] Appl. No.: 9,489

[52] U.S. Cl. ..........................192/12 C, 192/18 A, 192/109 F
[51] Int. Cl. .......................................................F16d 67/02
[58] Field of Search ...................192/12 C, 18 A, 17 A, 109 F

[56] References Cited

UNITED STATES PATENTS 3,213,989 10/1965 Harting..............................192/18 A Primary Examiner—Benjamin W. Wyche
Assistant Examiner—Randall Heald
Attorney—Greist, Lockwood, Greenawalt & Dewey

[57] ABSTRACT

The control valve controls the actuation of an hydraulically actuated clutch mechanism situated between a power input shaft and a power take-off (PTO) shaft on a tractor. The control valve has a biasing spring arrangement which will move the valve spool of the control valve from a clutch-engaged position to a clutch-disengaged position when the pressure of the operating fluid delivered to the control valve falls below a predetermined value. Such a loss of pressure will occur when the prime mover driving the pump which develops the fluid pressure is stopped. The automatic clutch deactivation requires positive actuation of the clutch mechanism to reconnect the PTO shaft with the input shaft, when the prime mover is again energized. The control valve also includes a modulating sleeve which is slidably mounted on the valve spool. When the valve spool is moved to a clutch-engaged position to open a pressure inlet port to communicate same with an outlet port leading to the clutch mechanism, the modulating sleeve is moved to a position partially blocking the flow of pressurized fluid to a fluid return port to thereby modulate the pressure of the fluid flowing to the outlet port communicating with the clutch mechanism. In this way, the modulating sleeve provides smooth clutch actuation. Additionally, the control valve controls the flow of lubricating oil to the clutch mechanism and the actuation of an hydraulically actuated brake mechanism for holding the PTO shaft against rotation.

4 Claims, 4 Drawing Figures

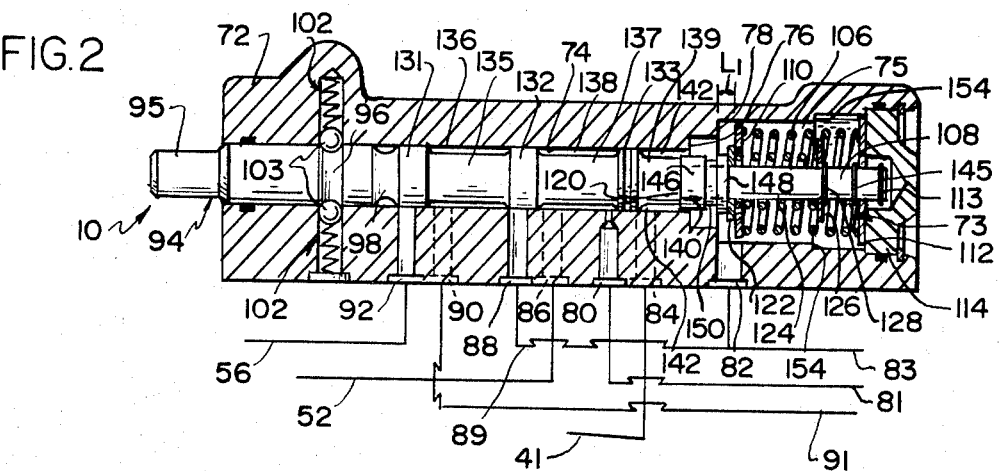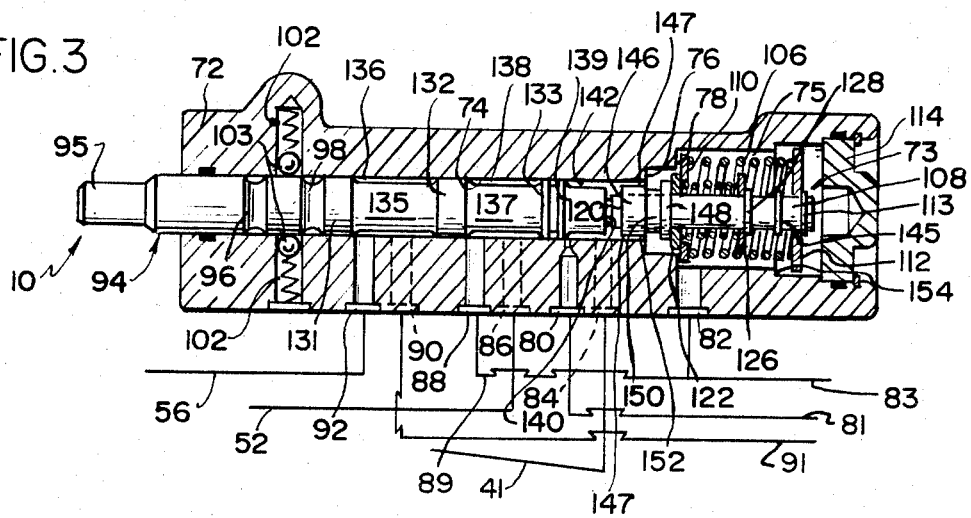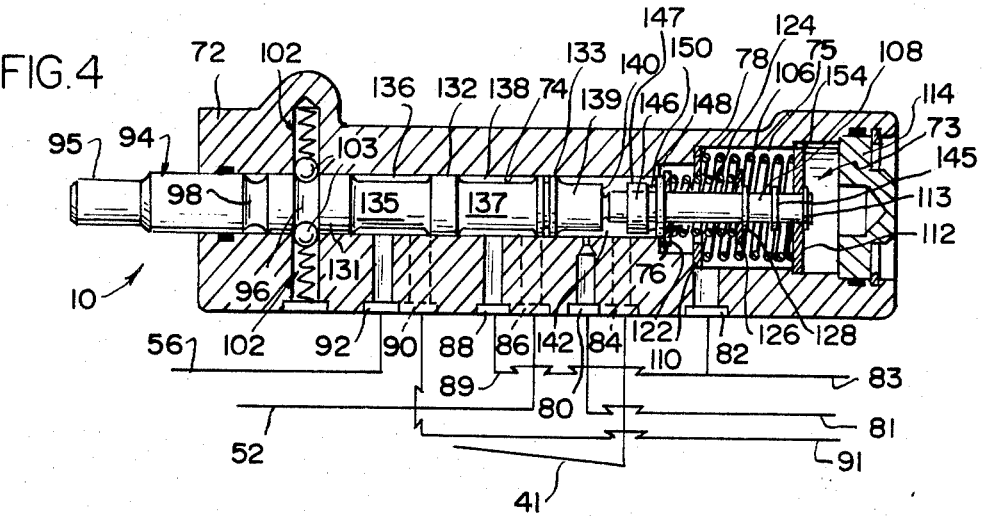

POWER TAKE-OFF CONTROL VALVE

The present invention relates to a control valve which is particularly adapted for controlling the engagement and disengagement of an hydraulically actuated clutch mechanism situated between an input shaft and a power take-off (PTO) shaft. More specifically, the control valve automatically disengages the clutch mechanism when fluid pressure is "lost," so that, when fluid pressure is regained, a positive actuation of the control valve is required to reconnect the input shaft with the PTO shaft. Also, the control valve controls the flow of lubricating fluid to the shafts, the clutch mechanism and associated moving parts, as well as the flow of pressurized fluid to an hydraulically actuated brake mechanism for holding the PTO shaft against rotation to prevent free rotation of the PTO shaft as a result of clutch plate drag. Additionally, the control valve includes a modulating sleeve for modulating the pressure of the fluid flowing to the clutch mechanism to provide a smooth clutch actuation.

Accordingly, a general object of the present invention is the provision of a control valve for controlling the engagement and disengagement of an hydraulically actuated clutch mechanism situated between a power input shaft and an output shaft and for automatically disengaging the clutch mechanism when oil pressure is "lost" such as when the prime mover driving the oil pump is stopped, so that a positive actuation of the control valve is required to again engage the clutch mechanism when the prime mover is again energized.

Another object of the present invention is the provision of a control valve having a valve spool movable between an inlet port-open-position and an inlet-port-closed position, and biasing means adapted to move the valve spool from the inlet-port-open position to the inlet-port-closed position when there is a drop in the pressure of the operating fluid below a predetermined value.

Another object of the present invention is the provision of a control valve of the type described for controlling the flow of pressurized fluid to an hydraulically actuated clutch mechanism in such a way that the pressure of the operating fluid is modulated to provide a smooth and controlled clutch actuation.

Another object of the present invention is the provision of a control valve having a valve spool which is held in a desired position without any external locking of the valve spool.

Another object of the present invention is the provision of a control valve having a valve spool which is held in one position partly by a spring biased detent and partly by pressurized fluid acting on the valve spool against the force of a biasing spring which biases the valve spool toward another position, the biasing spring having sufficient force to overcome the holding force of the spring biased detent when the pressure of the fluid drops below a predetermined value so that the biasing spring can move the valve spool from the one position to the other position.

Another object of the present invention is the provision of a control valve for controlling the engagement and disengagement of an hydraulically actuated clutch mechanism situated between an input shaft and an output shaft in such a way that the output shaft can rotate freely when the clutch is disengaged.

Another object of the present invention is the provision of a control valve for controlling the flow of pressurized fluid to an hydraulically actuated clutch mechanism situated between a drive shaft and a driven shaft and for controlling the flow of lubricating fluid to the clutch mechanism and other moving parts associated therewith.

Another object of the present invention is the provision of a control valve which controls the actuation of an hydraulically actuated clutch mechanism situated between a drive shaft and a driven shaft and also the actuation of an hydraulically actuated brake mechanism associated with the clutch mechanism for stopping free rotation of the driven shaft when the clutch mechanism is disengaged.

Still another object of the present invention is the provision of a power take-off unit particularly adapted for use on a tractor and including a power input shaft driven by a prime mover, a power output shaft, and an hydraulically actuated clutch mechanism situated between the input shaft and the output shaft in combination with a control valve for controlling the flow of pressurized fluid to the clutch mechanism for actuating same where the pressure of the fluid is developed by a pump driven by the prime mover, the control valve including a biasing spring for moving the valve spool of the control valve from a clutch-engaged position to a clutch-disengaged position upon a drop in fluid pressure below a predetermined value such as when the prime mover and the pump driven thereby are stopped, so that after the prime mover is again energized, positive actuation of the control valve is required to actuate the clutch mechanism to operatively reconnect the input shaft with the output shaft.

These and other objects and advantages of the present invention, and the manner of their attainment, will become apparent from the following detailed description of a preferred embodiment of the invention taken in conjunction with the accompanying drawings wherein:

FIG. 2 is a sectional view of the control valve shown in FIG. 1 with the valve spool of the control valve in the brake-engaged position where the driven shaft is held against rotation;

FIG. 3 is a sectional view of the control valve shown in FIG. 1 as the valve spool is being moved to the clutch-engaged position; and, FIG. 4 is a sectional view of the control valve shown in FIG. 1 with the valve spool in the clutch-engaged position.

Figure 1:
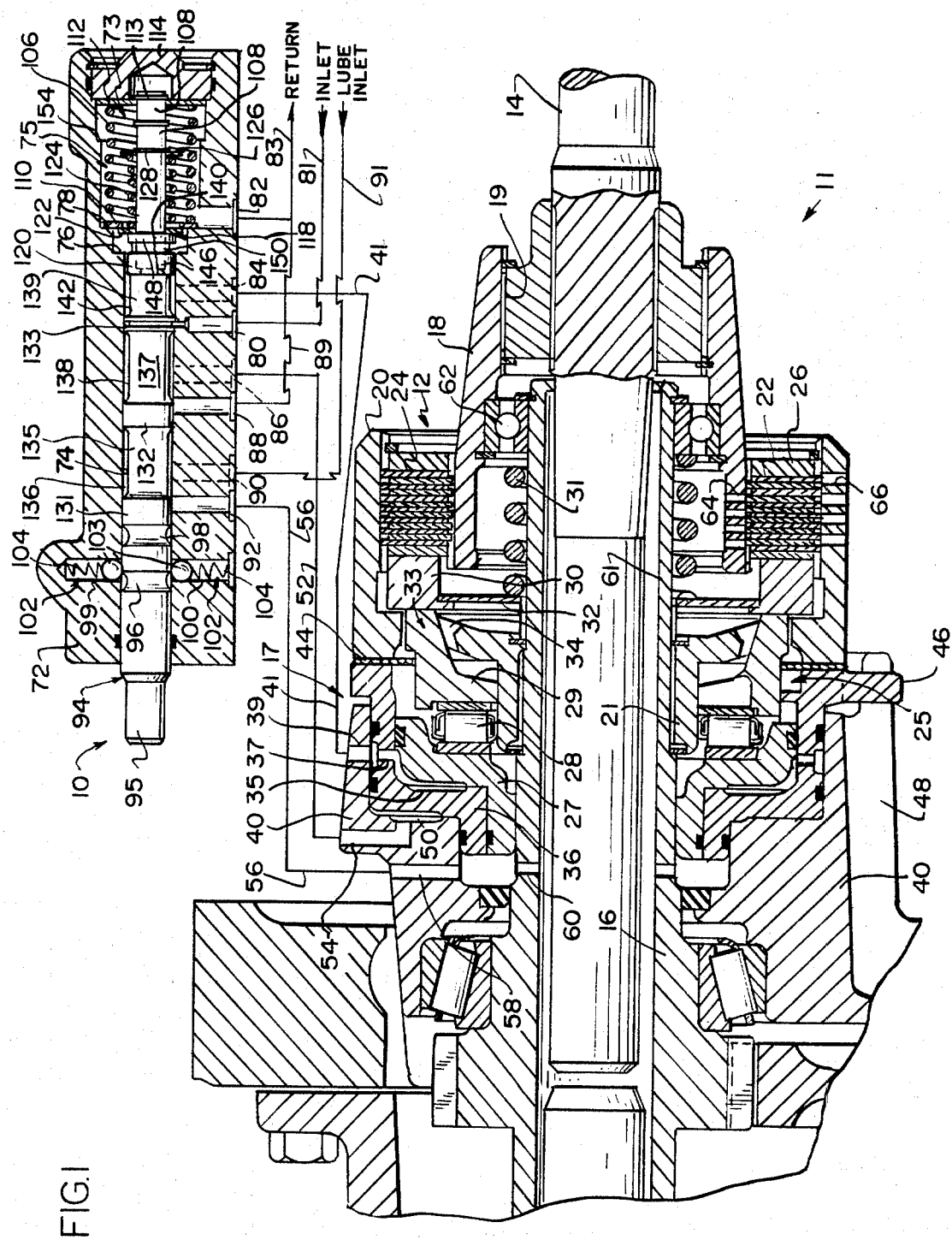
FIG. 1 is a sectional view of the control valve of the present invention and a sectional view of a power take-off unit, the connections between the power take-off unit and the control valve being shown schematically.

Referring now to the drawings in greater detail, the control valve of the present invention is generally indicated at 10 in FIG. 1 and is particularly adapted for use with a power take-off unit generally indicated at 11 for controlling the engagement and disengagement of a hydraulically actuated clutch mechanism 12 of the unit 11 situated between an input or drive shaft 14 and hollow output or driven shaft 16 which drives a power take-off shaft, such as is commonly found on a farm tractor. Additionally, as will be explained in greater detail hereinafter, the control valve 10 controls the flow of lubricating oil to the clutch mechanism 12 and the actuation of a hydraulically actuated brake mechanism, generally indicated at 17, for holding the driven shaft 16 against rotation.

The clutch mechanism 12 is of known type and includes a drive hub 18 splined at 19 to the drive shaft 14 and a driven hub 20 splined at 21 to the driven shaft 16. A plurality of first clutch plates 22 are splined to the drive hub 18 and a plurality of second clutch plates 24 are splined to the driven hub 20 and interleafed with the first clutch plates 22 to form a stack of interleafed clutch plates 22 and 24.

The clutch mechanism 12 is actuated or engaged by compressing the stack of clutch plates 22 and 24. This is accomplished by forcing a clutch piston assembly 25 against one end of the stack of clutch plates 22 and 24 to compress the same between the clutch piston assembly 25 and an annular end plate 26 of the driven hub 20. The clutch piston assembly 25 includes a clutch piston 27 which is positioned to move against one side of a thrust bearing 28 to move a clutch actuator 29 on the other side of the bearing 28 against a collar-shaped follower 30 to move the follower 30 into engagement with the stack of clutch plates 22 and 24 against the action of a return spring 31 which bears against a washer 32 positioned between the collar 30 and the spring 31. As shown, the clutch actuator 29 has a plurality of finger portions 33 which extend through openings 34 in the driven hub 20 for engaging the follower 30 when the follower 30 is forced against the plates 22 and 24.

The clutch piston assembly 25 is actuated by applying pressurized fluid from the control valve 10 to a cavity 35 which is formed between the clutch piston 27 and a brake piston 36 of the brake mechanism 17. For this purpose, the cavity 35 communicates with the control valve 10 via a passage 37 in the brake piston 36 of the brake mechanism 17, a port 39 in a clutch housing member 40 and a fluid line 41. When pressure is relieved from the cavity 35, the compressed return spring 31, bearing against the washer 32, will move the other components of the clutch piston assembly 25 to the clutch-disengaged position shown in FIG. 1.

The brake mechanism 17 is adapted to hold the driven shaft 16 against indefinite rotation, such as is caused by lubricating oil flowing in the spaces between the clutch plates 22 and 24. This indefinite rotation is commonly referred to as clutch plate drag. To minimize wear on the brake piston 36 and the driven hub 20, the brake mechanism 17 also includes a brake plate 44 situated between the brake piston 36 and the driven hub 20. To prevent rotation of the brake piston 36, the brake piston 36 has a tang 46 which extends radially therefrom and is received in a slot 48 formed in the housing member 40.

The brake mechanism 17 is operated by applying pressurized fluid to a cavity 50 formed between the housing member 40 and the brake piston 36 to cause the brake piston 36 to move against the brake plate 44 so that the plate 44 frictionally engages the brake piston 36 and the driven hub 20, locking the same together to hold the driven hub 20 against rotation. For this purpose, pressurized fluid is delivered to the cavity 50 from the control valve 10 via a fluid line 52 and a passageway 54 formed in the housing member 40.

It is to be noted that movement of the brake piston 36 to a brake position where the driven hub 20 is held against rotation will cause a slight movement of the clutch piston assembly 25 by reason of the brake piston 36 engaging and moving the clutch piston 27 a short distance. When this movement of the clutch piston 27 occurs the return spring 31 is compressed so that when fluid pressure is relieved from the cavity 50, the return spring 31 moves the brake piston 36 away from the brake plate 44 to disengage the brake mechanism 17.

Lubricating oil is delivered to the clutch mechanism 12 from the control valve 10 via oil line 56, a passageway 58 in the housing member 40, holes 60 formed in and transversely of the hollow driven shaft 16, the hollow bore 61 of the shaft 16, a drive hub support bearing 62 and holes 64 in the drive hub 18 to the spaces between the clutch plates 22 and 24. The lubricating oil then travels through holes 66 in the driven hub 20 to a reservoir or sump (not shown) located beneath the clutch mechanism 12.

When the clutch mechanism 12 is disengaged, the lubricating oil flowing between the clutch plates 22 and 24 will cause clutch plate drag resulting in the indefinite rotation of the driven shaft 16 described above. As will be more fully explained in connection with the description of the control valve 10, the control valve 10 is adapted to interrupt the flow of lubricating oil to the oil line 56 when the control valve 10 is actuated to operate the brake mechanism 17. In this way, not only is rotation of the driven shaft 16 prevented by actuating the brake mechanism 17 but also clutch plate drag is minimized by "cutting off" the flow of lubricating oil to the clutch plates 22 and 24.

Referring now to the construction of the control valve 10, the valve 10 includes a valve housing 72 having a bore 73 extending therethrough which is formed partly by a straight bore 74 and partly by a stepped bore 75, two of the steps being defined by annular shoulders 76 and 78. The housing 72 has seven ports therein communicating with the bore 73. These ports are identified as follows: a pressurized fluid inlet port 80 connected to a fluid inlet line 81, a fluid return port 82 connected to a fluid return line 83, a clutch port 84 connected to the fluid line 41, a brake port 86 connected to the fluid line 52, a brake return port 88 connected to a brake fluid return line 89 which is connected to the fluid return line 83, a lubricating oil inlet port 90 connected to a lubricating oil inlet line 91, and a lubricating oil outlet port 92 connected to the lubricating oil line 56.

A valve spool 94 is slidably received in the bore 74 with one end portion 95 of the valve spool 94 extending from the valve housing 72 for engagement with a suitable valve actuating mechanism not shown. The valve spool 94 has two annular grooves 96 and 98 and the valve housing 72 has two diametrically opposed, transverse bores 99 and 100 which open into the bore 74. The transverse bores 99 and 100 are situated so that, upon appropriate positioning of the valve spool 94, the bores 99 and 100 will open into one of the annular grooves 96 or 98 as shown in FIGS. 2 and 3. Each of the transverse bores 99 and 100 is adapted to receive a spring biased detent 102 including a metal ball 103 which is biased toward the bore 74 by a spring 104. The metal balls 103 of the detents 102 are adapted to be received in one of the annular grooves 96 and 98 to hold the valve spool 94 in a particular position in the bore 74. As will be more fully explained hereinafter, when the balls 103 are received in the annular groove 96 as shown in FIG. 2 the valve spool 94 is in a brake-engaged position, when the balls 103 are received in the annular groove 98 as shown in FIG. 4 the valve spool 94 is in a clutch-engaged position, and when the balls 103 are in the position shown in FIG. 1 where they engage the valve spool 94 at a point between the grooves 96 and 98 the valve spool 94 is in a neutral or clutch-disengaged position.

The valve spool 94 is held within the bore 73 by a positioning or centering spring 106 which is disposed around a reduced diameter end portion 108 of the valve spool 94, opposite the end portion 95. The spring 106 is disposed between a washer 110 which bears against the shoulder 78 and a washer 112 which bears against a snap ring 113 on the end portion 108. The right hand of the bore 73 is closed by a plug 114 and, in the clutch-disengaged position or the brake-engaged position of the valve spool 94, the washer 112 bear against the plug 114 as shown in FIGS. 1 and 2.

A pressure modulating assembly 118 is mounted on the end portion 108 and includes a modulating sleeve 120, a washer 122 which is situated between the modulating sleeve 120 and the washer 110, a modulating spring 124 and a washer 126 which engages a snap ring 128 on the end portion 108 of the valve spool 94 to hold the modulating spring 124 between the washers 122 and 126.

The middle portion of the valve spool 94 between the annular groove 98 and the end portion 108 includes first, second and third port closing portions 131, 132 and 133, as well as a first reduced diameter portion 135 situated between the port closing portions 131 and 132 and defining a first passage 136 with the bore 74, a second reduced diameter portion 137 situated between the port closing portions 132 and 133 and defining a second passage 138 with the bore 74, and a third reduced diameter portion 139 extending from the port closing portion 133 to a shoulder 140 (FIG. 3) which defines the beginning of the end portion 108. The shoulder 140 limits inward movement of the modulating sleeve 120 on the end portion 108; and the reduced diameter portion 139, portions of the modulating sleeve 120 and the reduced diameter end portion 108 define a third passage 142 with the bore 74.

Referring now to the operation of the control valve 10, when the valve spool 94 is moved to the neutral or clutch-disengaged position, as shown in FIG. 1, the valve spool 94 is positioned by the pressure of the spring 106 acting on the end portion 108 through the washer 112 and the snap ring 113. Here the spring 106 is expanded to its fullest extent within the bore 73 with one end acting on the plug 114 and the other end acting on the shoulder 78. In this position of the valve spool 94, the port closing portion 133 is disposed over the fluid inlet port 80 to prevent pressurized fluid from entering the valve passages 138 and 142. Also, the brake port 86 is in communication with the brake return port 88 via the passage 138 and the lubricating oil inlet port 90 is in communication with the lubricating oil outlet port 92 via the passage 136. Thus, in the clutch disengaged position, the clutch mechanism 12 and the brake mechanism 17 are disengaged and the flow of lubricating oil is permitted.

FIG. 2 shows the valve spool 94 moved to the brake-engaged position. In this position, the valve spool 94 is held in position by the holding force of the balls 103 engaging in the annular groove 96. The spring 106 is now compressed a distance $L_1$ between the washer 110 and the washer 112 as a result of the movement of the valve spool 94, with the modulating sleeve 120 and the washer 122 thereon, toward the plug 114.

The compressed spring 106 now biases the valve spool 94 toward the neutral position shown in FIG. 1. In one embodiment, the holding force of the detents 102 is sufficient to hold the valve spool 94 in the brake-engaged position if fluid pressure is lost.

A snap ring 145 is mounted on the end portion 108 between the snap rings 126 and 113 and is adapted to engage the washer 112 bearing against the plug 114 to limit inward movement of the valve spool 94, as shown in FIG. 2, and in this way prevent the valve spool 94 from being moved past the brake-engaged position.

With the valve spool 94 in the position shown in FIG. 2, the fluid inlet port 80 communicates with the brake port 86 via passage 138, the brake return port 88 is blocked by the port closing portion 132 and the lubricating oil outlet port 92 is blocked by the port closing portion 131. Also, the clutch port 84 communicates with the fluid return port 82 via the passage 142. Thus, in the brake-engaged position, the clutch mechanism 12 is disengaged, the brake mechanism 17 is operated by the pressure applied to the cavity 50 which forces the brake piston 36 and the brake plate 44 against the driven hub 20 to hold the same against rotation, and the flow of lubricating oil to the clutch mechanism 12 is blocked.

As best shown in FIGS. 3 and 4, the modulating sleeve 120 has: a first ring portion 146 with an outer diameter which is equal to the diameter of the bore 74 and with oppositely facing flats 147; a second ring portion 148 with an outer diameter substantially equal to the diameter of the bore 74 so that when the modulating sleeve 120 is moved to the left of the shoulder 76 into the bore 74 the second ring portion 148 will close off the straight bore 74 from the stepped bore 75; and an annular groove separating the first ring portion 146 from the second ring portion 148. It will be noted that the flats 147 define the portions of the modulating sleeve 120 which cooperate with the reduced diameter portion 139 and the bore 74 to define the third passage 142.

As the valve spool 94 is moved from the brake-engaged position or the neutral position, the port closing portion 133 is moved to the left of the fluid inlet port 80, as shown in FIG. 3, to allow pressurized fluid to enter the passage 142. The pressurized fluid will then flow past the flats 147 and between the ring portion 148 and the shoulder 76 to the fluid return port 82. Since, in this instantaneous position of the valve spool 94 shown in FIG. 3, the ring portion 148 of the modulating sleeve 120 is on the right hand side of the shoulder 76. Then, as the valve spool 94 is moved further to the left toward the clutch engaged position, the flow of pressurized fluid to the return port 82 is restricted by reason of the movement of the ring portion 148 toward the shoulder 76. This gradual blocking of the flow of pressurized fluid through the passage 142 to the return port 82 causes a build-up of the pressure of the fluid in the passage 142. This pressure build-up is communicated to the clutch mechanism 12 via the clutch port 84 and the fluid line 41. Additionally, this pressure build-up moves the modulating sleeve 120 a slight distance to the right against the force of the modulating spring 124 which is then compressed slightly.

It will be understood that the instantaneous pressure on the clutch plates 22 and 24 and the distance the modulating spring is compressed are both related to the distance the valve spool 94 has been moved toward the clutch-engaged position. Thus, by reason of the pressurized fluid acting on the modulating sleeve 120 against the modulating spring 124 and flowing past the sleeve 120 to the return port 82, the pressure of the fluid which is communicated, via the clutch port 84 and the fluid line 41, to clutch plates 22 and 24, is modulated. Stated otherwise, fluid pressure on the clutch plates 22 and 24 is proportional to the distance the valve spool 94 has been moved, and the pressure modulating assembly 118 aids in more accurately controlling (modulating) this pressure which is applied to the clutch plates 22 and 24 during engagement of the clutch mechanism 12.

When the ring portion 148 of the modulating sleeve 120 is moved slightly into the bore 74 under the action of the modulating spring 124, fluid flow through the passage 142 to the stepped bore 75 is stopped, and the clutch mechanism 12 is then in the fully engaged condition where maximum clutch operating pressure is obtained.

As shown in FIG. 4, the modulating sleeve 120 is held in position by fluid pressure acting against the sleeve 120 and reacting against the port blocking portion 133 on the valve spool 94, and by the modulating spring 124 which urges the sleeve 120 into the bore 74 against the fluid pressure. In this position, the second ring portion 148 of the modulating sleeve 120 bears against the washer 122 and the pressure of the fluid in the passage 142 compresses the spring 124 slightly such that the washer 122 does not engage the shoulder 76 so long as the pressure of the fluid in the passage 142 is above a predetermined value. In this clutch-engaged position, the valve spool 94 is biased toward the neutral position by the force of the centering spring 106 compressed between the washers 110 and 112 (the washer 110 bearing against the shoulder 78 and the washer 112 bearing against the snap ring 113 on the end portion 108 of the valve spool 94). The valve spool 94 is held in this position against the force of the compressed spring 124 by the holding force of the detents 102 engaged in the annular groove 98. When the fluid pressure is reduced below the predetermined value, the force of the compressed springs 106 and 124 acting on the end portion 108, (i.e., between the shoulders 78, 76 and the washers 112, 126) is sufficient to force the valve spool 94 to the right overcoming the holding force of the detents 102 which are forced out of the annular groove 98 such that the port closing portion 133 is moved over the inlet port 80 to close the same. After this movement has taken place, the valve spool 94 will be in the neutral or clutch-disengaged position shown in FIG. 1.

Thus, whenever there is a loss or drop in the fluid pressure in the passage 142 and the valve spool 94 is in the clutch-engaged position, an automatic clutch deactivation will take place. In this way, when fluid pressure is again established, the valve spool 94 will not be in the clutch-engaged position and the driven shaft 16 will not be operatively connected to the drive shaft 14 until the valve spool 94 is again placed in the clutch-engaged position.

Referring again to FIG. 4, it will be noted that when the valve spool 94 is in the clutch-engaged position, not only is the clutch port 84 in communication with the fluid inlet port 80 via the passage 142, but also the lubricating oil inlet port 90 is in communication with the lubricating oil outlet port 92 via the passage 136 to permit lubricating oil to flow to the clutch mechanism 12, and the brake port 86 is in communication with the brake return port 88 via the passage 138 so that the brake mechanism 42 is not actuated.

Additionally, it is to be noted that the stepped bore 75 includes a shoulder 154 which is engaged by the washer 112 when the valve spool 94 is moved to the clutch-engaged position to prevent movement of the valve spool 94 to the left past the clutch-engaged position.

We claim:

1. In combination with a power take-off unit adapted for use on a tractor and comprising a power input shaft driven by a prime mover, a power output shaft, an hydraulically actuated clutch mechanism situated between said input shaft and said output shaft and adapted to operatively connect said input shaft with said output shaft when pressurized fluid, from a pump driven by said prime mover, is delivered to said clutch mechanism for actuating same, and an hydraulically actuated brake mechanism for holding said output shaft against rotation, a control valve for controlling the flow of said pressurized fluid either to said clutch mechanism or to said brake mechanism, said control valve including a valve housing having a bore therein, a fluid inlet port for admitting said pressurized fluid into said bore, a first fluid outlet port communicating said bore with said clutch mechanism, a second fluid outlet port communicating said bore with said brake mechanism, a valve spool movable in said bore between a first inlet-port-open position wherein said inlet port is in communication with said first outlet port for delivering said pressurized fluid to said clutch mechanism to actuate the same, a second inlet-port-open position wherein said inlet port is in communication with said second outlet port for delivering said pressurized fluid to said brake mechanism to actuate the same, and an inlet-port-closed position, and means for biasing said valve spool toward said inlet-port-closed position from either of said inlet-port-open positions, said biasing means being operable upon a drop in the pressure of said pressurized fluid below a predetermined value to move said valve spool from said first inlet-port-open position to said inlet-port-closed position whereby when said prime mover and said pump driven thereby are stopped, said valve spool is automatically moved to said inlet-port-closed position so that, after said prime mover is again energized, movement of said valve spool to said first inlet-port-open position is necessary to actuate said clutch mechanism for transmitting rotary power from said input shaft to said output shaft.

2. The combination as defined in claim 1 wherein said valve housing has a lubricating oil inlet port for admitting lubricating oil into said bore and a lubricating oil outlet port communicating said bore with said clutch mechanism and with the moving parts associated therewith, said lubricating oil inlet port being in communication with said lubricating oil outlet port when said valve spool is in said first inlet-port-open position or said inlet-port-closed position, and said lubricating oil outlet port being closed when said valve spool is in said second inlet-port-open position.

3. A control valve including a valve housing having a bore therein, a fluid inlet port for admitting pressurized fluid into said bore, first and second fluid outlet ports communicating with said bore, a valve spool in said bore movable in one axial direction from a neutral position where said inlet port is closed to a first position where said inlet port is in communication with said first outlet port, and in the opposite axial direction from said neutral position to a second position where said inlet port is in communication with said second outlet port, said bore having an enlarged portion which extends between first and second spaced apart stops, a portion of said spool being received in said enlarged bore portion, a biasing spring encircling said portion of said spool, and first and second spaced apart retaining means mounted on said portion of said spool for engaging opposite ends of said spring, said spring extending between said stops and biasing said retaining means against said stops when said spool is in said neutral position, so that, when said spool is moved in one axial direction to said first position said spring is compressed between said first stop and said first retaining means to bias said spool toward said neutral position against fluid pressure acting on said spool, and when said spool is moved in the opposite axial direction to said second position said spring is compressed between said second stop and said second retaining means to bias said spool toward said neutral position against fluid pressure acting on said spool, whereby, upon a drop in fluid pressure below a predetermined value said spring will automatically move said spool from said first position or said second position to said neutral position.

4. A control valve including a valve housing having a bore therein, a fluid inlet port for admitting pressurized fluid into said bore, first and second fluid outlet ports communicating with said bore, a valve spool in said bore movable in one axial direction from a neutral position wherein said inlet port is closed to a first position wherein said inlet port is in communication with said first outlet port and movable in the opposite direction from said neutral to a second position wherein said inlet port is in communication with said second outlet port, said bore having an enlarged portion adjacent one end which extends between first and second internal stops, a portion of said spool being received in said enlarged bore portion, a pressure modulating sleeve slidably mounted on said spool and normally positioned between said first outlet port and said first internal stop, a larger diameter biasing spring encircling said portion of said spool, first and second retaining washers slidably mounted on said portion of said spool at opposite ends of said larger diameter biasing spring with said first washer engagable with said first internal stop and said second washer engagable with said second internal stop so as to restrain said larger diameter biasing spring therebetween, a smaller diameter biasing spring encircling said portion of said spool in between a restraining washer thereon and the adjacent end of said pressure modulating sleeve which is the more remote end from said first outlet port, spring detent means releasably retaining said valve spool in either said first position or in said second position, said larger diameter biasing spring being fully extended between said internal stops when said valve spool is in said neutral position so as to bias said valve spool toward its neutral position when moved into either its said first or second position said biasing action being insufficient to overcome the retaining action of said spring detent means, movement of valve spool toward and into said first position increasing the compression of said smaller diameter baising spring against the force of pressurized fluid admitted through said fluid inlet port, the compressive force due to said increased compression of said smaller diameter biasing spring combined with said biasing action of said larger diameter biasing spring being sufficient to overcome said retaining action of said spring detent means whereby said valve spool is automatically returned to its said neutral position on loss of the force of said pressurized fluid.

* * * * *